(12) United States Patent
Tardif et al.

(10) Patent No.: US 7,544,120 B1
(45) Date of Patent: Jun. 9, 2009

(54) TREE HANGER

(76) Inventors: Ronnie S. Tardif, 1405 Lemon St., Cocoa, FL (US) 32926; Daniel J. Park, 4077 Friar Tuck La., Melbourne, FL (US) 32935

( * ) Notice: Subject to any disclaimer, the term of this patent is extended or adjusted under 35 U.S.C. 154(b) by 0 days.

(21) Appl. No.: 12/048,572

(22) Filed: Mar. 14, 2008

(51) Int. Cl.
*A22B 1/00* (2006.01)
(52) U.S. Cl. ....................................................... 452/187
(58) Field of Classification Search ........................ None
See application file for complete search history.

(56) References Cited

U.S. PATENT DOCUMENTS

| | | |
|---|---|---|
| 1,250,599 A | 12/1917 | Lee |
| 3,051,116 A | 8/1962 | Weil |
| 3,115,216 A | 12/1963 | Sandnes |
| 4,541,149 A | 9/1985 | Jensen |
| 5,049,110 A * | 9/1991 | Owens .......................... 452/187 |
| 5,263,675 A | 11/1993 | Roberts et al. |
| 5,479,870 A | 1/1996 | Corzine |
| 5,562,534 A * | 10/1996 | McGough ...................... 452/187 |
| 5,588,907 A | 12/1996 | DePietro et al. |
| 5,820,455 A * | 10/1998 | Breedlove ..................... 452/187 |
| 6,662,903 B2 | 12/2003 | Johnson |
| 6,695,688 B1 * | 2/2004 | Owen et al. ................... 452/187 |
| 6,715,585 B1 * | 4/2004 | Overbaugh .................... 182/187 |
| 6,739,964 B2 * | 5/2004 | Gearhart ....................... 452/187 |
| 7,207,415 B2 * | 4/2007 | McGehee ...................... 182/135 |
| 7,244,173 B2 * | 7/2007 | Lake ............................ 452/128 |
| 7,314,406 B2 * | 1/2008 | Bilinovich .................... 452/185 |
| 2003/0094553 A1 | 5/2003 | Mullis |

* cited by examiner

*Primary Examiner*—Thomas Price
(74) *Attorney, Agent, or Firm*—Brian S. Steinberger; Law Offices of Brian S. Steinberger, P.A.

(57) ABSTRACT

Portable and lightweight hanger for raising and supporting weights such as game carcasses from posts, such as tress. The hanger can include a triangular crane shaped frame having a bent tip end, and an enlarged base with open side portion that abuts against a surface of the tree. A cable having stopper ends attaches an upper portion of the frame to the tree by having stopper ends being inserted into keyhole slots on a midportion of the frame. The bent tip can have a slot for allowing a rope to be pulled therethrough to list game carcasses up into the air to be cleaned. The hanger can be carried and installed on a tree by a single hunter without damaging the tree since no fasteners such as nails, and screws are used.

16 Claims, 12 Drawing Sheets

TREE HANGER

This invention relates to tree hangers, in particular to portable and lightweight devices, apparatus, systems and methods of hanging and raising weights such as game carcasses from tree hangers that only require one user to mount the hanger to a tree.

BACKGROUND AND PRIOR ART

Hunters have preferred to clean their game, such as a deer, or wild hog, or bear soon after the game is caught. A usual technique for cleaning game has required the hunter to run a wire or rope between two trees for the game, or throwing one end of the rope/wire over a tree limb or attaching a hook to a tree. However, there are problems with these techniques. For example, the rope/wire between trees requires two good sized trees in proximity to one another strong enough to support game that can weigh up to a hundred pounds or more, which is not always an available option. Similarly, individual tree limbs are generally not able to support a game weighing up to a hundred pounds or more.

Also, the rope/wire and/or the hook may not be strong enough to support a game carcass that can weigh up to a hundred pounds or more. Additionally, it can be difficult for the hunter to physically raise the game up in the air, especially if the hunter is hunting alone. Still furthermore, once the game is raised up to the rope/wire and/or hook, it can be difficult for the hunter to lower the game once it has been cleaned without dropping the game to the ground.

Still furthermore, a single end mounted rope/wire or a hook, does not allow for the game to be thoroughly cleaned since one side may be adjacent to or too close to the tree itself, making cleaning around all sides of the game difficult to achieve.

Thus, wires/ropes and hooks are not practical for supporting game to be cleaned.

Various types of tree mountable brackets with or without hoists have also been proposed over the years. See for example, U.S. Pat. Nos.: 5,049,110 to Owens; 5,263,675 to Roberts et al.; 5,562,534 to McGough; 5,588,907 to DePietro et al.; 5,820,455 to Breedlove; 6,662,903 to Johnson; 6,695,688 to Owen et al.; 6.739,964 to Gearhart; and U.S. Published Patent Application 2003/0094553 to Mullis. However, these brackets have also been problematic and undesirable to use.

For example, these brackets all generally require two persons to raise the bracket and attach the bracket to a tree, which is impossible to do if the hunter is hunting alone. Many of these brackets are heavy and are difficult to transport since they also can require two or more persons to properly move and raise the bracket and attach it to the tree. Also, large brackets require a large storage location which also is not practical for hunters having small vehicles, and the like.

Additionally, many of these brackets require loose belts, loose chains, and/or separate mounting parts that must be carefully attached about the trees that can be difficult and time consuming for the hunter who needs to quickly raise the game to be cleaned. Still furthermore, many of these brackets require lifting the bracket to a height that requires a ladder or require the hunter to physically climb the tree to attach the bracket to a high location on the tree which is difficult and usually unpractical to most hunters.

Thus, the need exists for solutions to the above problems with the prior art.

SUMMARY OF THE INVENTION

A primary objective of the present invention is to provide portable devices, apparatus, systems and methods of hanging game from tree hangers, where only one person is needed to move, raise and attach the hanger to a tree.

A second objective of the present invention is to provide portable devices, apparatus, systems and methods of hanging game from tree hangers, which can be attached to a tree in minutes, and taken down from a tree in minutes.

A third objective of the present invention is to provide portable devices, apparatus, systems and methods of hanging game from tree hangers, which can support weights of up to approximately 1,000 pounds or more.

A fourth objective of the present invention is to provide portable devices, apparatus, systems and methods of hanging game from tree hangers, where the hanger is small enough to be held and carried in one hand.

A fifth objective of the present invention is to provide portable devices, apparatus, systems and methods of hanging game from tree hangers, which are lightweight being less than approximately 15 pounds.

A sixth objective of the present invention is to provide portable devices, apparatus, systems and methods of hanging game from tree hangers, which are small enough to be transported in the trunk of most automobiles.

A seventh objective of the present invention is to provide portable devices, apparatus, systems and methods of hanging game from tree hangers, that is environmentally safe on trees due to no fasteners such as nails and screws, and the like, are used, which can be cause damage to the trees.

An embodiment can include a 2 to 3 foot tall triangular metal frame having crane shape. The enlarged base has a flat bar, with two outwardly expanding metal bars, each with raised grooved edges so that it can abut against a tree. The frame has about three elongated solid type metal bars that form a triangular shape that comes together at a tip.

The tip has a bent end with a through-hole/slot. A ring and/or clamp can be suspended from the slot opening at the tip end of the frame. The ring and/or clamp can suspend dead game from it.

The frame can be secured to a tree trunk by wrapping a semi-flexible rigid cable with ends having plural enlarged metal stops. The metal stops at each end of the cable can fit into the large openings of keyhole shaped slots in a mounting flange located in a midportion of the frame.

The cable can have different metal stops arranged at different points along the cable so that the cable can be lengthened or shortened depending on the size of the tree. The stops can be inserted through the large openings of the keyhole slots, and then moved to the narrow openings of the keyhole slots. The stops can then be restricted from being removed once the cable ends are moved into the narrow openings of the keyhole slots.

Once the frame/crane is attached to a tree trunk, game such as deer, wild hogs, bears, and the like, can be suspended from the clamp that is attached to the tip end of the crane frame. With the game suspended, a single hunter can easily clean all sides of the carcasses of the game that is suspended in the air.

The invention can include method steps of pre-attaching one end of the cable to a keyhole slot on the frame. Next, an installed can raise the frame against the tree with one hand and attaching the cable about the tree with the other hand so that the opposite end with stoppers can be positioned and oriented into the other keyhole slot on the frame. The weight of the frame moving downward can lock this end into the other keyhole slot, and the frame can rest in a fixed raised position on the tree by the grooved teeth on the open side of the enlarged base abutting against one surface of the tree, while the looped around cable on the opposite side of the tree rests against another surface of the tree.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

Figures 1, 2:
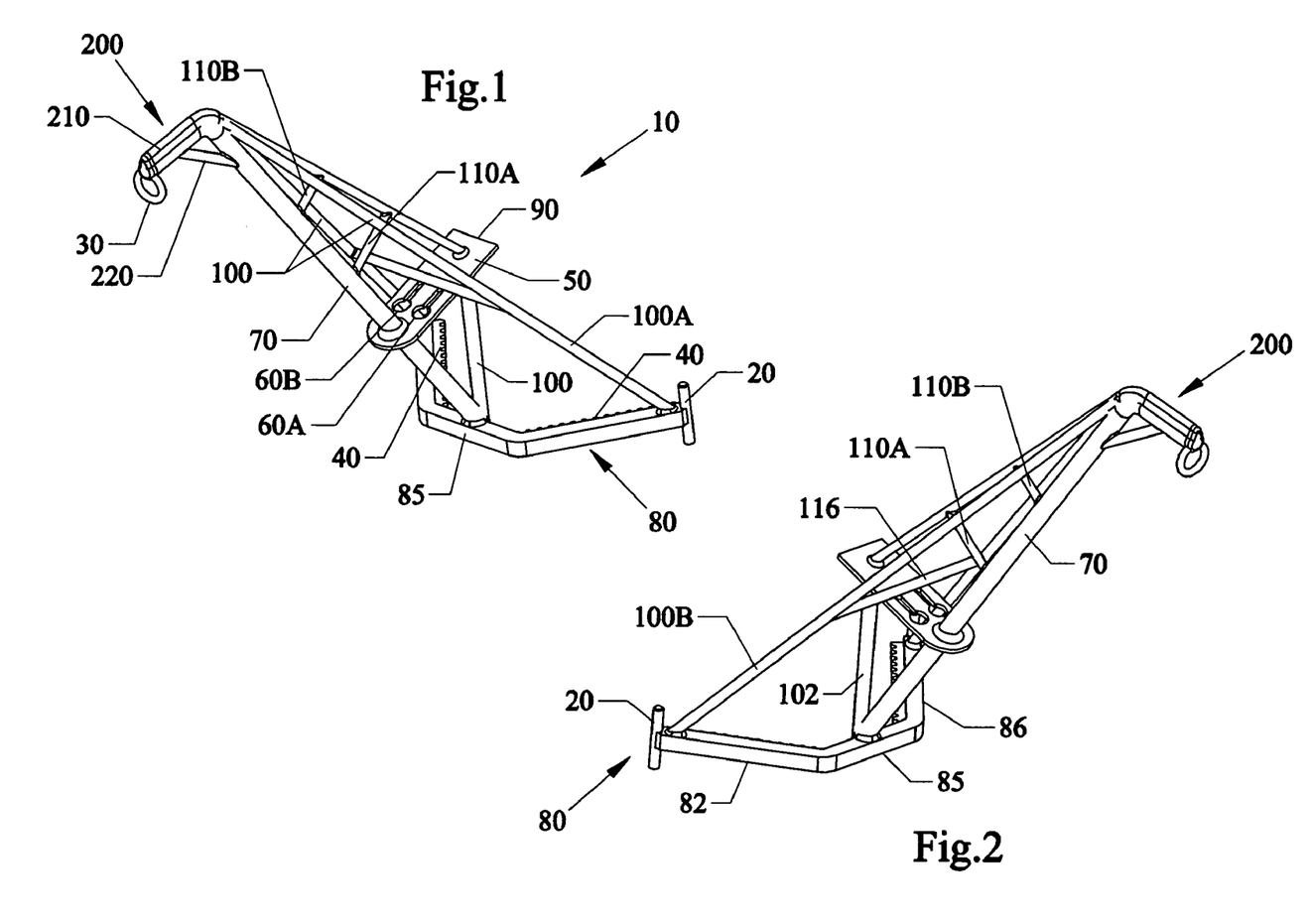
FIG. 1 is a right front perspective view of the game tree hanger frame.
FIG. 2 is a left front perspective view of the hanger frame of FIG. 1.
Figure 3:
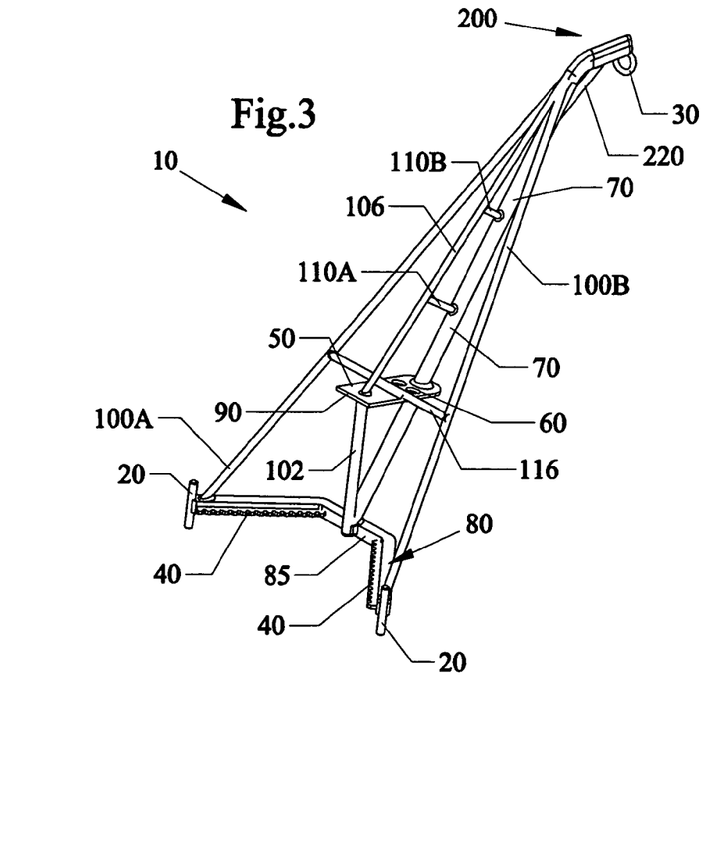
FIG. 3 is a left rear perspective view of the hanger frame of FIG. 1.
Figure 4:
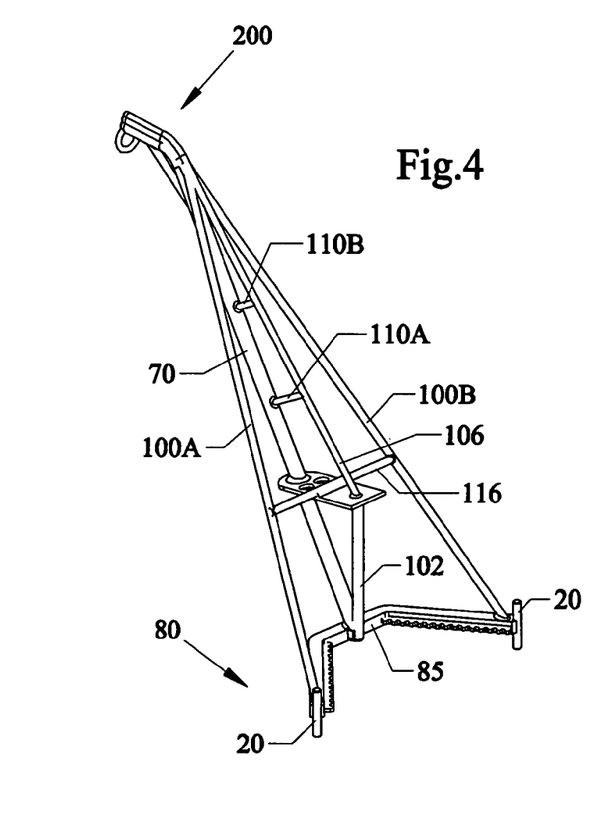
FIG. 4 is a right rear perspective view of the hanger frame of FIG. 1.
Figure 5:
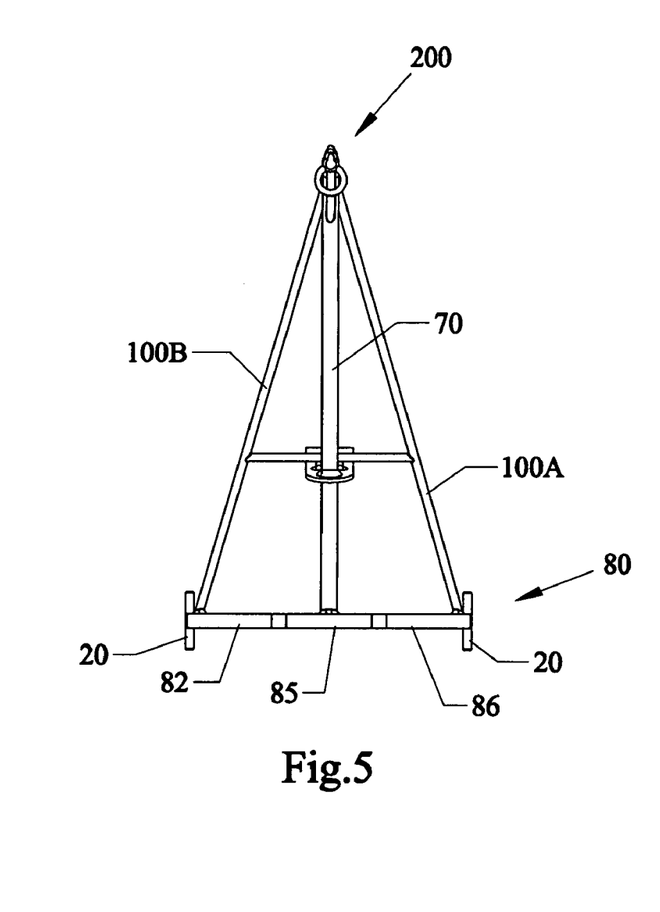
FIG. 5 is a front view of the hanger frame of FIG. 1.
Figure 6:
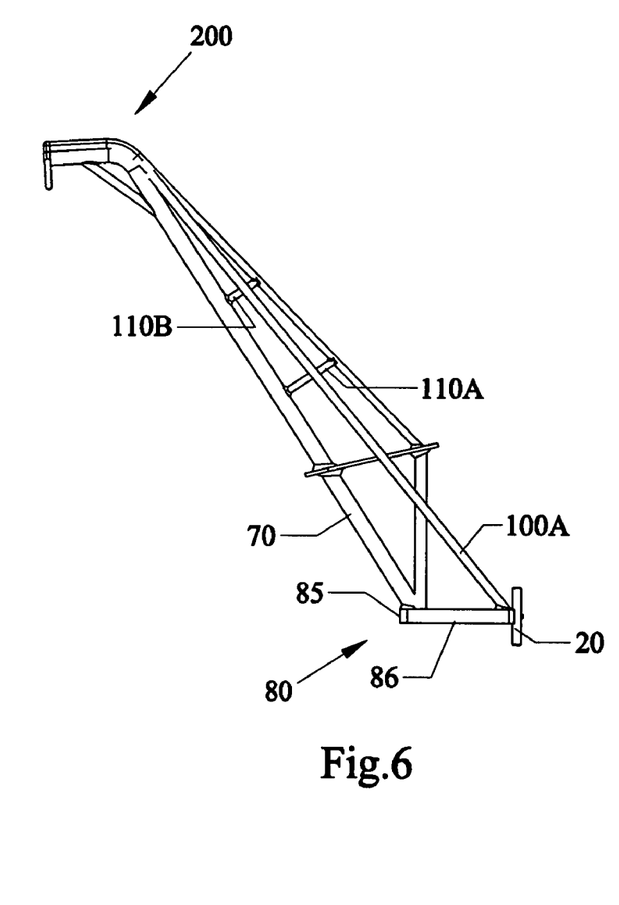
FIG. 6 is a right side view of the hanger frame of FIG. 1.
Figure 7:
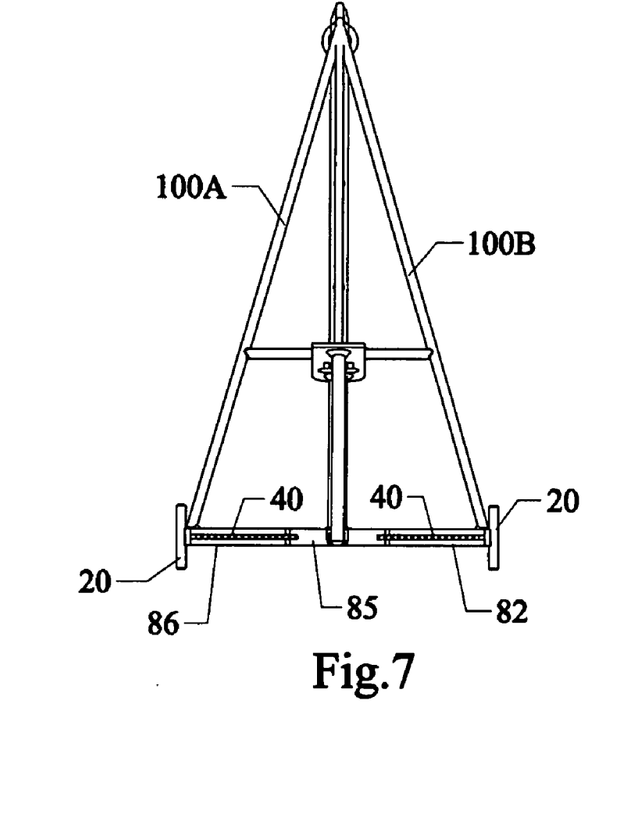
FIG. 7 is a rear view of the hanger frame of FIG. 1.
Figure 8:
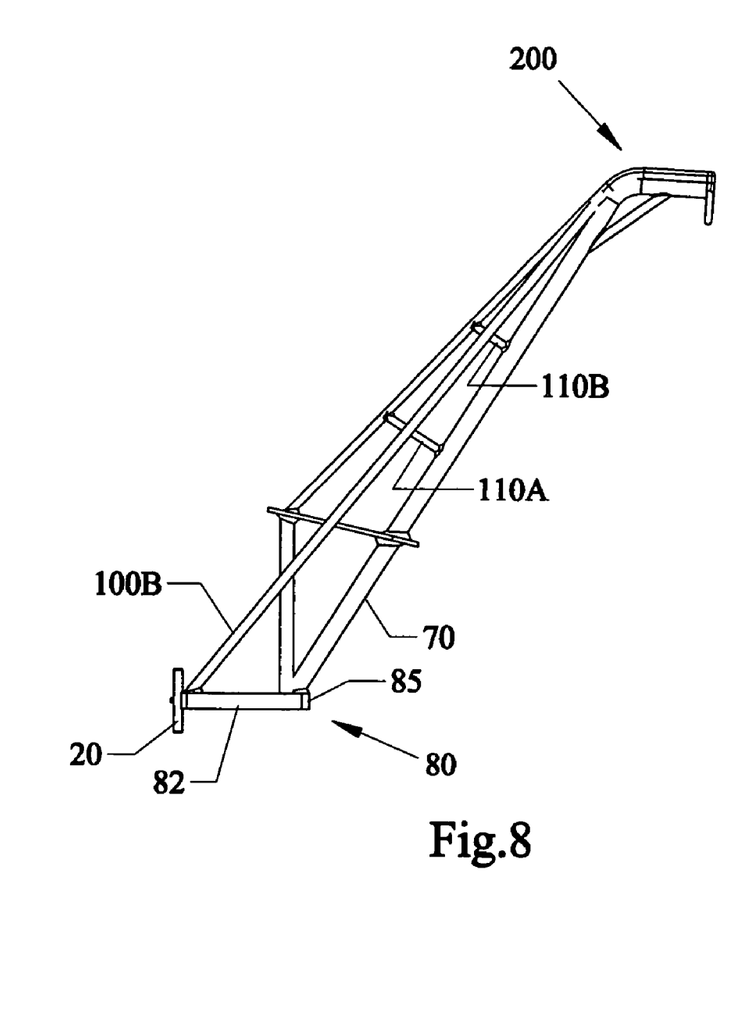
FIG. 8 is a left side view of the hanger frame of FIG. 1.

The components in the drawing figures are listed below.
Tree Hanger Designator Descriptions
10. Tree Hanger Frame.
20. Tie-off cleat.
30. Lifting ring.
40. Tree grabbing teeth/raised grooved edges.
50. Cable locking flange plate.
60. Cable locking keyway.
70. Main spar(bar)(hollow).
80. Tree bracket Base
82, 86 Outwardly Expanding Tree bracket members
85. Base front member bracket member
90. Tree contact point.
100A, 100B. Support spars(solid).
102. lower support bar for flange plate 50
106. upper support bar for flange plate 50
110A, 110B. Rearwardly Facing Cross braces(solid).
116. Main cross brace for support spars
120. Adjustable hanging cable assembly.
130. Cable.
140A, 140B. Cable stops.
150. Tree.
160. Game animal.
170. Rope.
180. Knot.
200. Upper Tip
210. Bent end
220. cross brace FIG. 1 is a right front perspective view of the game tree hanger frame 10. FIG. 2 is a left front perspective view of the hanger frame 10 of FIG. 1. FIG. 3 is a left rear perspective view of the hanger frame 10 of FIG. 1. FIG. 4 is a right rear perspective view of the hanger frame 10 of FIG. 1. FIG. 5 is a front view of the hanger frame 10 of FIG. 1. FIG. 6 is a right side view of the hanger frame 10 of FIG. 1. FIG. 7 is a rear view of the hanger frame 10 of FIG. 1. FIG. 8 is a left side view of the hanger frame 10 of FIG. 1.

Referring to FIGS. 1-8, hanger frame 10 formed from metal tube members that can have a generally crane shape with an enlarged bottom tree bracket base 80 and a upper tip 200 having a length of approximately 2 to approximately three feet therebetween, and an overall weight of approximately 10 to approximately 15 pounds.

The tree bracket base 80 can include a base bracket member 85 with outwardly expanding bracket members 82, 86 attached to ends of the member 85, and vertical tie-off cleats 20 at the exposed ends of the bracket members 82, 86, so that the bracket base forms a rear open portion to partially wrap about a tree. Along an inner surface of the two outwardly expanding bracket members 82, 86 can be grooved teeth strips of enhance the contact between the frame 10 and the tree, which will described later in reference to other figures.

The frame 10 can have about three main elongated solid type metal bars 100A, 100B, 70 that form a generally triangular shape between the base bracket 80 and the tip end 200. Outer support spars 100A, 100B, can be attached to outer ends of the bracket members 82, 86 and attach together at the tip end 200, and a main spar member 70 can run from a midportion of the base bracket member 85 to the upper tip 200.

A horizontal flange support plate 50 having a pair of keyhole slots 60 can be supported by a lower support bar 102 which attaches and stabilizes the plate 50 relative to the bracket member 85, and an upper support bar 106 which attaches and stabilizes the plate relate to the upper tip 200. A pair of rearwardly facing cross braces 110A, 110B can also attach and stabilize portions of the upper support bar 106 to an upper portion of the main spar 70. A main cross brace 106 adjacent flange plate 50 can attach and stabilize a mid portion of support spars 110A, 100B to one another. Lower support bar 102 and a lower portion of the main spar 70 can form a triangle shape therebetween, and upper support bar 106 and an upper portion of the main spar 70 can also form a triangular shape therebetween.

Upper tip 200 can have a bent end 210 protruding therefrom with a fixed lifting ring 30 with or without a clevis(U-shaped type clamp), with a cross brace 220 between a midportion of the bent end 210 and an upper portion of the main spar bar 70.

Figure 9:
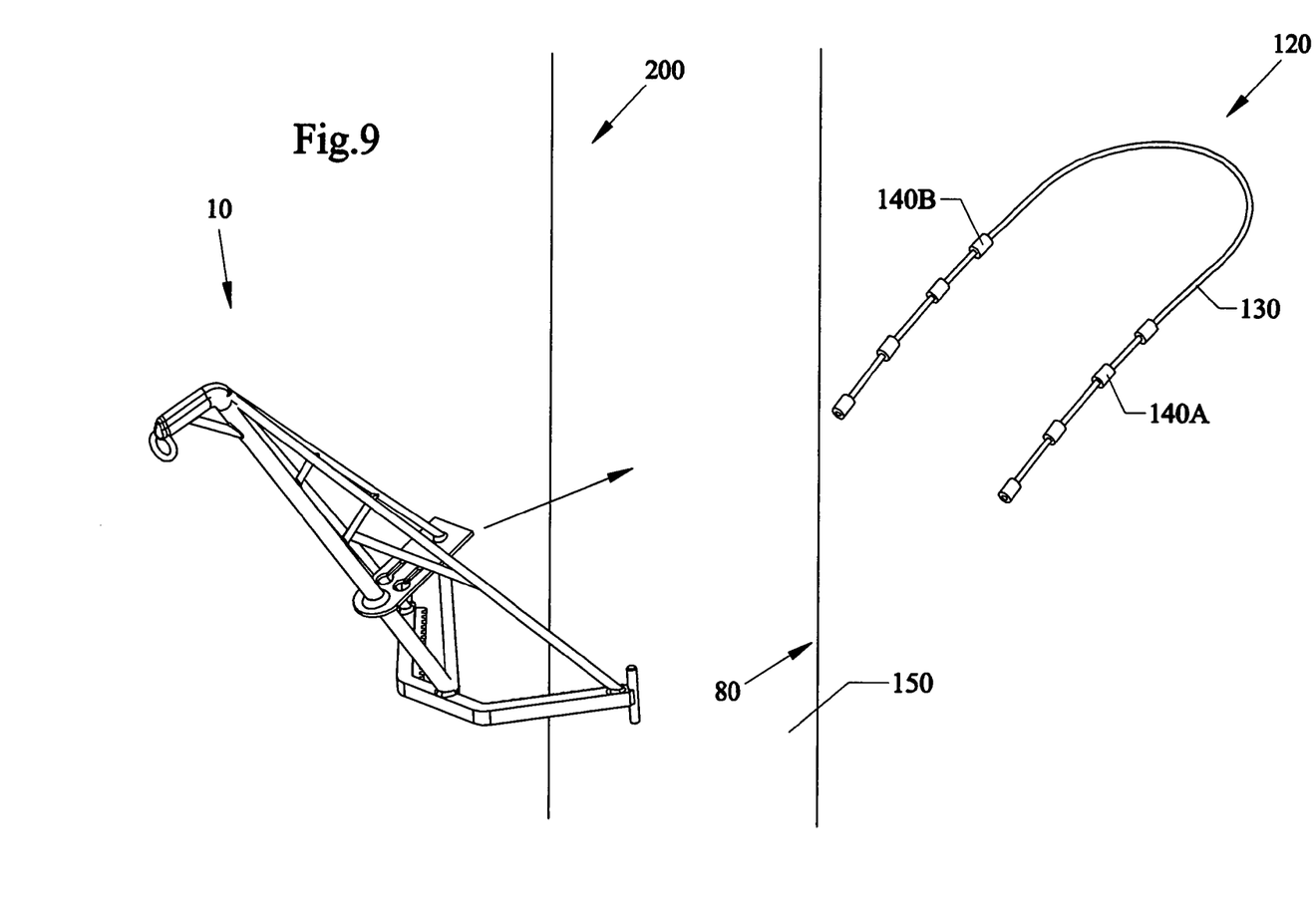
FIG. 9 is a perspective exploded view of hanger frame of FIGS. 1-8 detached from the cable with stops.
Figure 10:
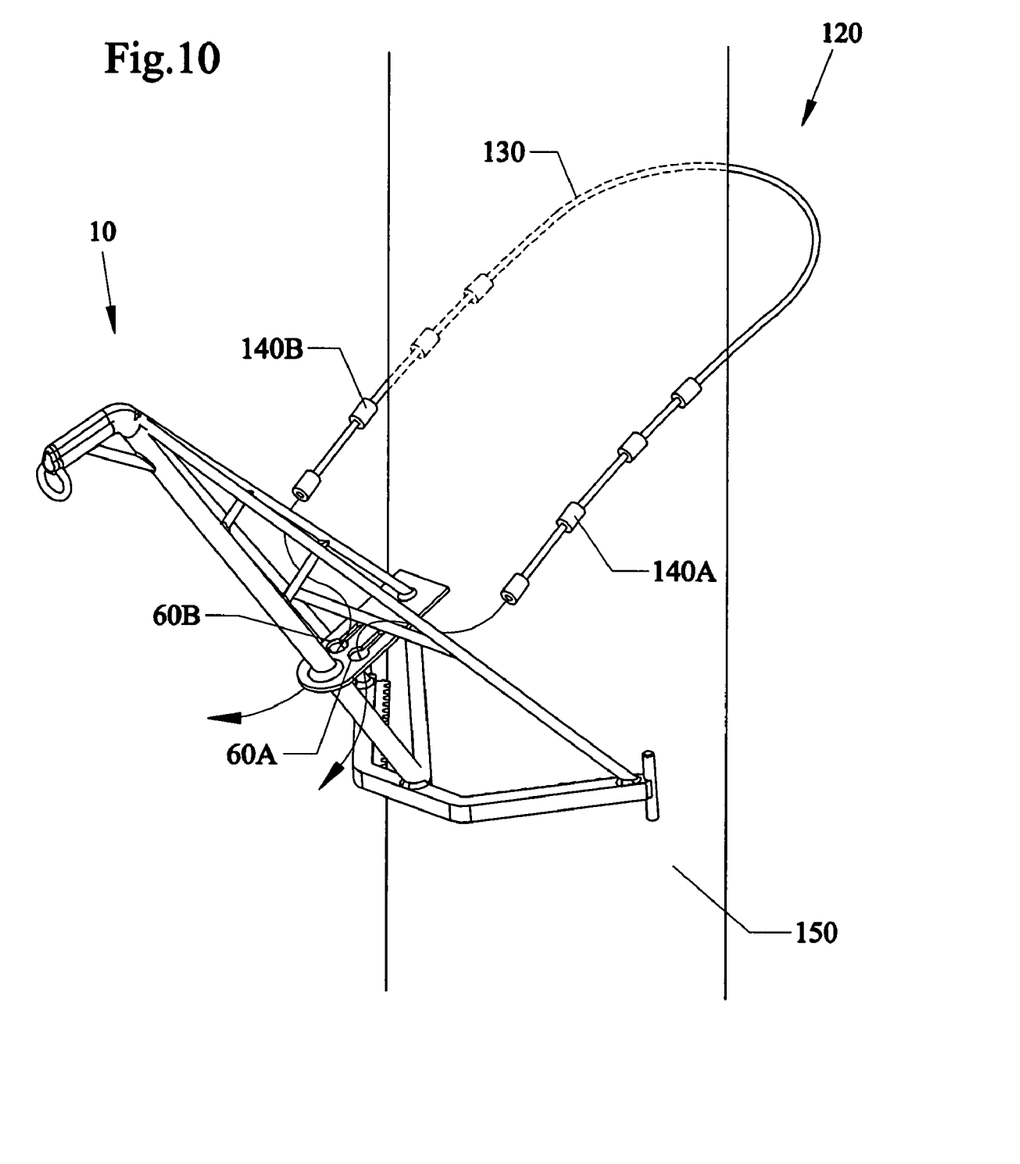
FIG. 10 is another view of the hanger frame and cable being positioned about the tree.
Figure 11:
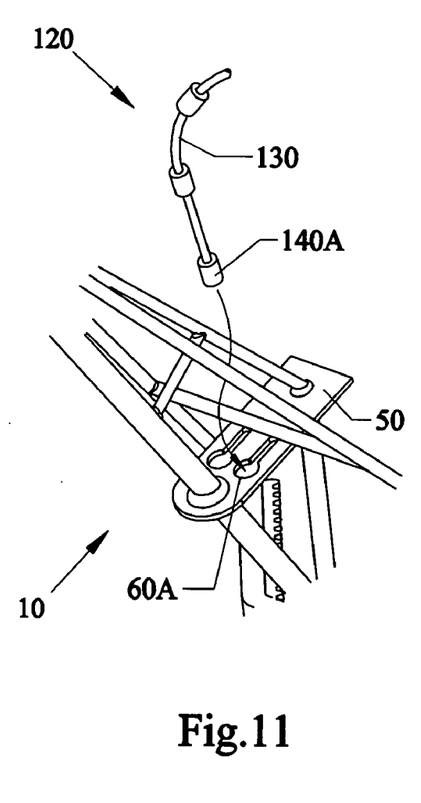
FIG. 11 is an enlarged view of the hanger frame of FIG. 10 with one end of the cable with stoppers being inserted into one of the keyhole slots on the frame.
Figure 12:
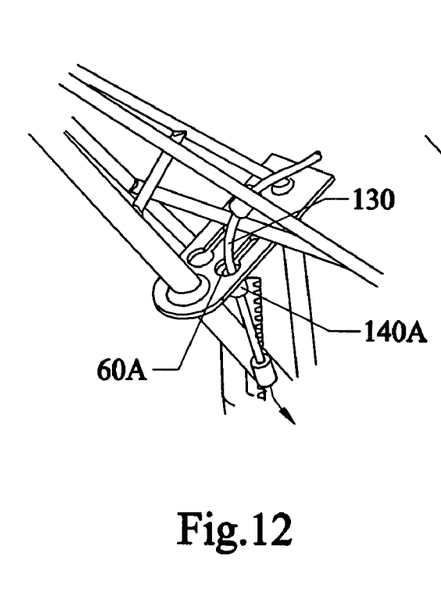
FIG. 12 shows the cable end with stoppers of inserted into the large opening of the keyhole slot on the frame shown in FIG. 11.
Figure 13:
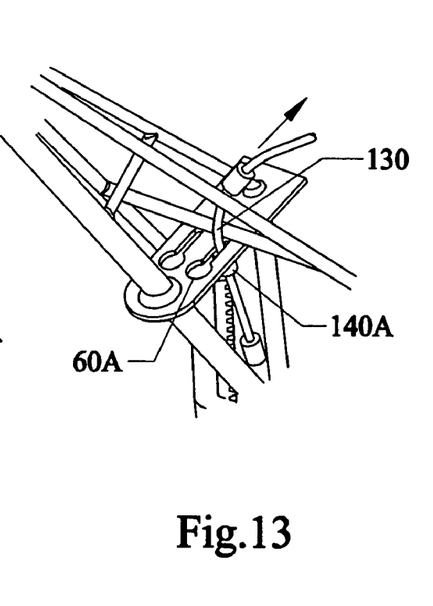
FIG. 13 shows the cable end with stopper being slid toward the narrow opening of the keyhole slot on the frame shown in FIG. 12.
Figure 14:
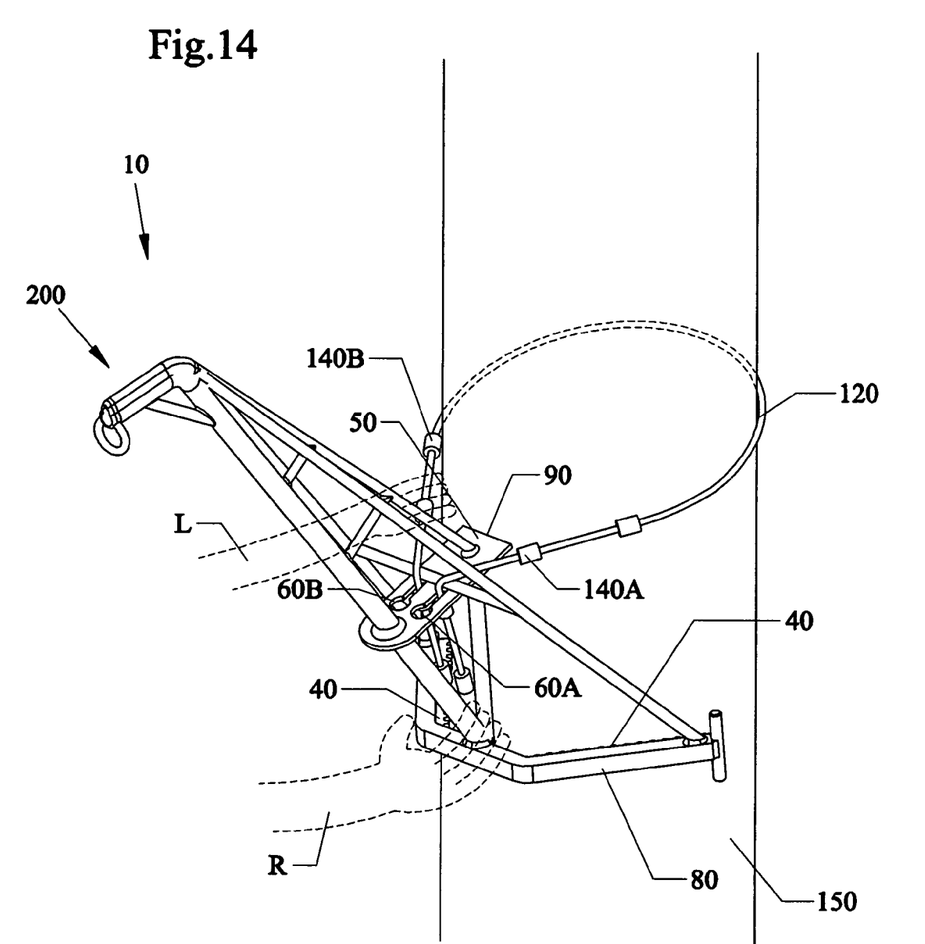
FIG. 14 shows the hanger frame of the preceding figures being held by one hand against the tree and other hand manipulating the other end of the cable into another keyhole slot.

FIG. 9 is a perspective exploded view of hanger frame 10 of FIGS. 1-8 detached from the cable 130 with stops 140A, and 140B, FIG. 10 is another view of the hanger frame 10 and cable 130 being positioned about the tree 150. FIG. 11 is an enlarged view of the hanger frame 10 of FIG. 10 with one end of the cable 130 with stoppers 140A, 140B being inserted into one of the keyhole slots 60A, 60B, on the frame. FIG. 12 shows the cable 130 end with stoppers 140A inserted into the large opening of the keyhole slot 60A on the frame 10 shown in FIG. 11. FIG. 13 shows the cable 130 end with stopper 140A being slid toward the narrow opening of the keyhole slot 60A on the frame 10 shown in FIG. 12. FIG. 14 shows the hanger frame 10 of the preceding figures being held by one hand against the tree 150 and other hand manipulating the other end of the cable 30 with stoppers 140B into another keyhole slot 60B.

Referring to FIGS. 9-14, the hanger frame 10 is light enough and small enough to allow for a single user to attach the adjustable cable assembly 120 with the hanger frame 10 to a tree 150. Initially, as shown by FIGS. 11-13, the user can orient the hanger frame 10 so that the wide openings of the keyhole slots 60A, 60B are lower the narrow openings of the keyhole slots 60A, 60B. Next, the user can install a single stopper 140A form a row of stoppers on one end of the cable 130 into a wide opening of a keyhole slot 60A, and then slide the cable upward in the angled keyhole slot 60A into the narrow opening of the same keyhole slot 60A. The cable can include strands of metal type parallel and/or wound type fibers wrapped by an outer sleeve such as a plastic sleeve, and the like. The metal can include but is not limited to stainless steel, galvanized metal, and the like, and other materials having similar strength.

After attaching one end of the cable 130, the user can physically raise the frame 10 with one hand R pushing the open bottom the tree grabbing teeth 40 against the tree 150. With their other hand L, the user can push the opposite end of the cable 120 with stoppers 140B about the tree 150 so that the opposite cable end falls into the wide opening of the other keyhole slot 60B. The cable is flexible but rigid enough to be able to partially raise one end of the cable by aiming the one end upward by grasping a midportion of the cable. The user can pull up on the cable 120 catching the one of the stoppers 140B into the narrow opening of the second keyhole slot 60B. The weight of the tip 200 of the frame 10 moving downward further locks the frame 10 against the tree 150.

Figure 15:
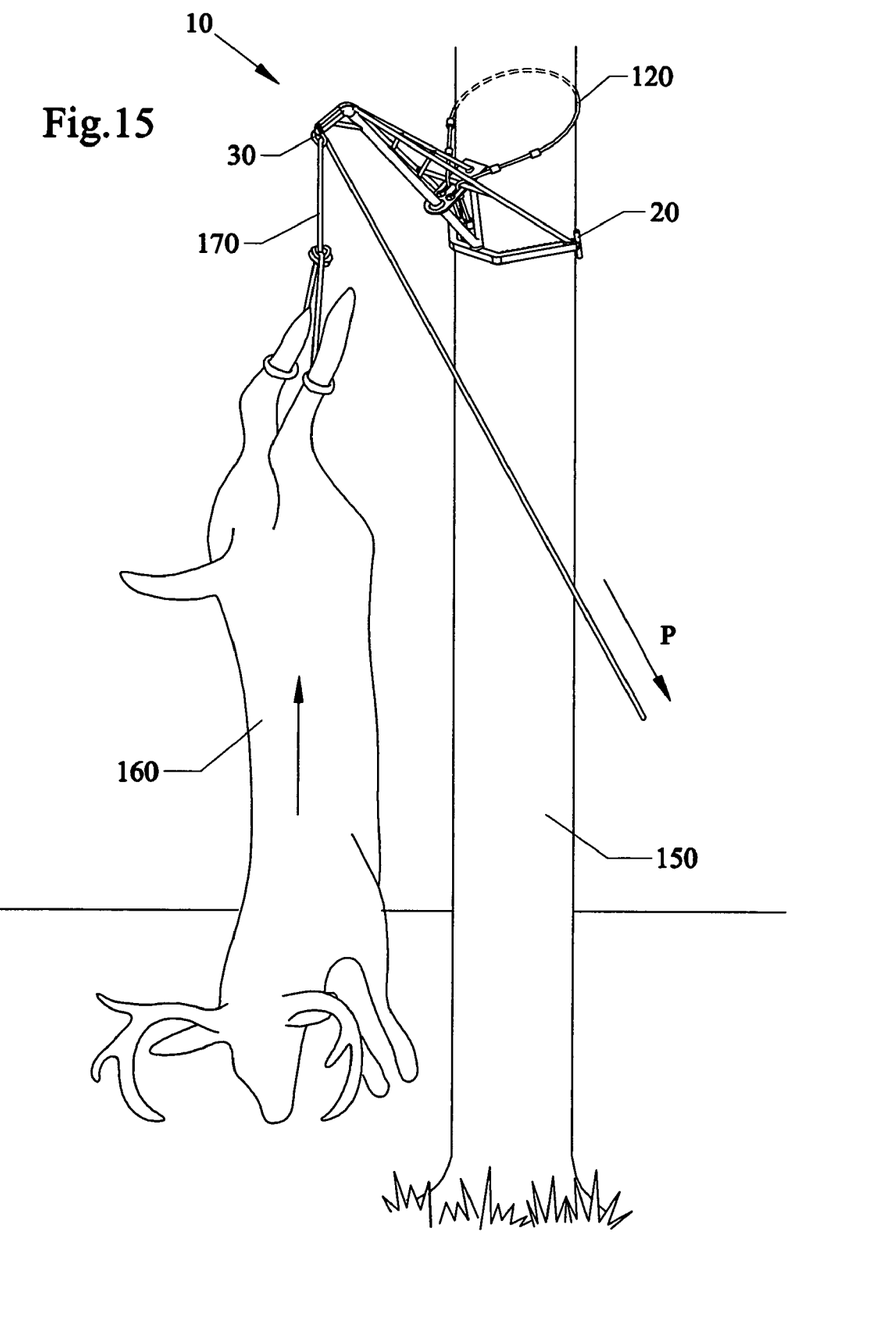
FIG. 15 shows the tree mounted hanger after it is pushed up on the tree installed and supporting a game carcass, where the carcass is pulled up and suspended in mid-air.

FIG. 15 shows the tree mounted hanger 10 after it is pushed up on the tree 150 installed and supporting a game carcass 160. Here, a loop end of rope 170 can pass through lifting ring 30 and be pulled from the opposite end in the direction of arrow P so that, the carcass is pulled up and suspended in mid-air.

Figure 16:
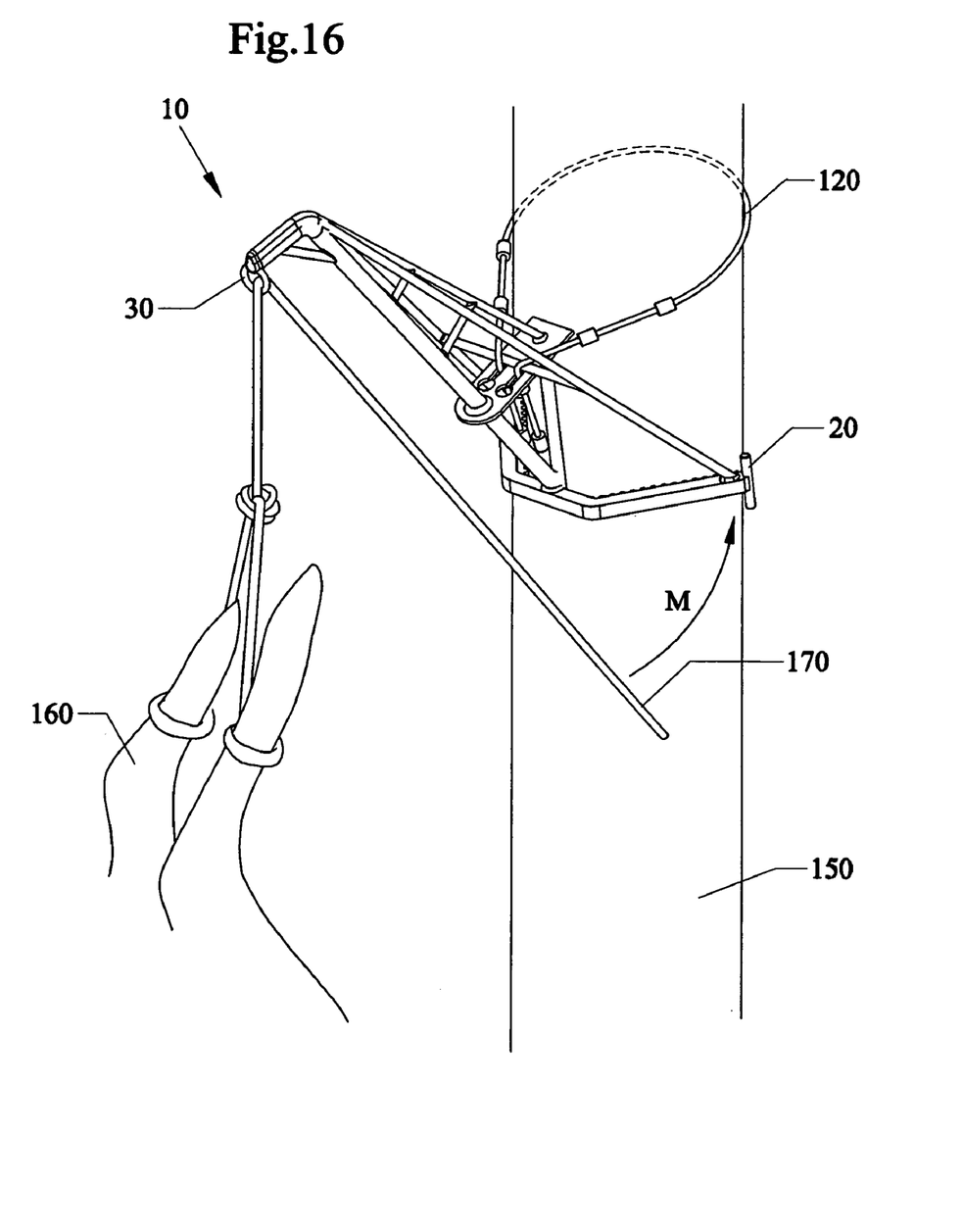
FIG. 16 is an enlarged view of the hanger with game carcass of FIG. 15 showing tension support points on the back and front of the tree, and rope end being loose.

FIG. 16 is an enlarged view of the hanger 20 with game carcass 160 of FIG. 15 showing tension support points on the back and front of the tree 150, and rope end 170 being loose and about to be moved in the direction of arrow M to a tie off cleat 20.

Figure 17:
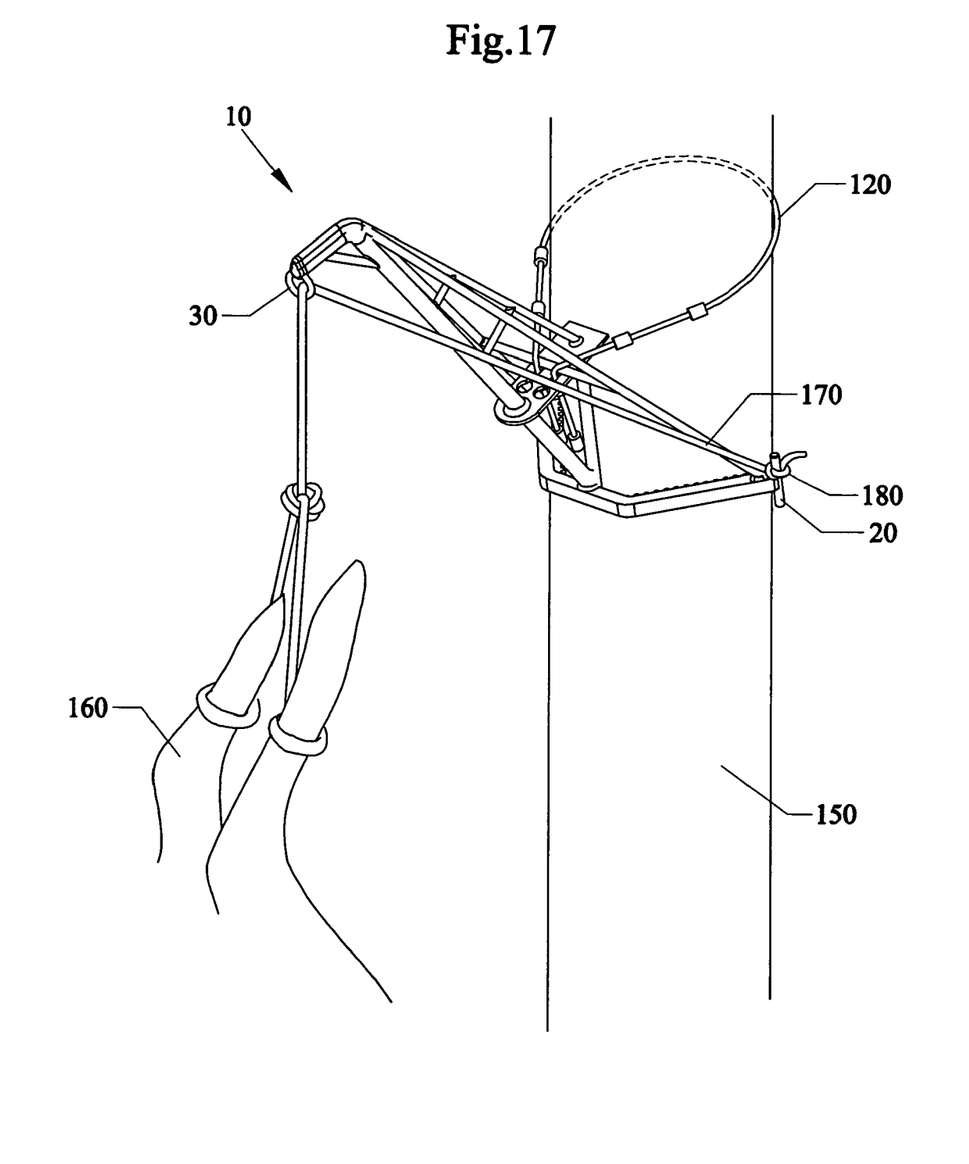
FIG. 17 is another view of the tree mounted hanger of FIG. 16 with rope end now tied off.

FIG. 17 is another view of the tree mounted hanger 10 of FIG. 16 with outer end of rope 170 tied off on a cleat 20 with a knot that holds the game carcass 160 up in the air sot that the user can freely move about the carcass 160 to clean the entire carcass 160.

Figure 18:
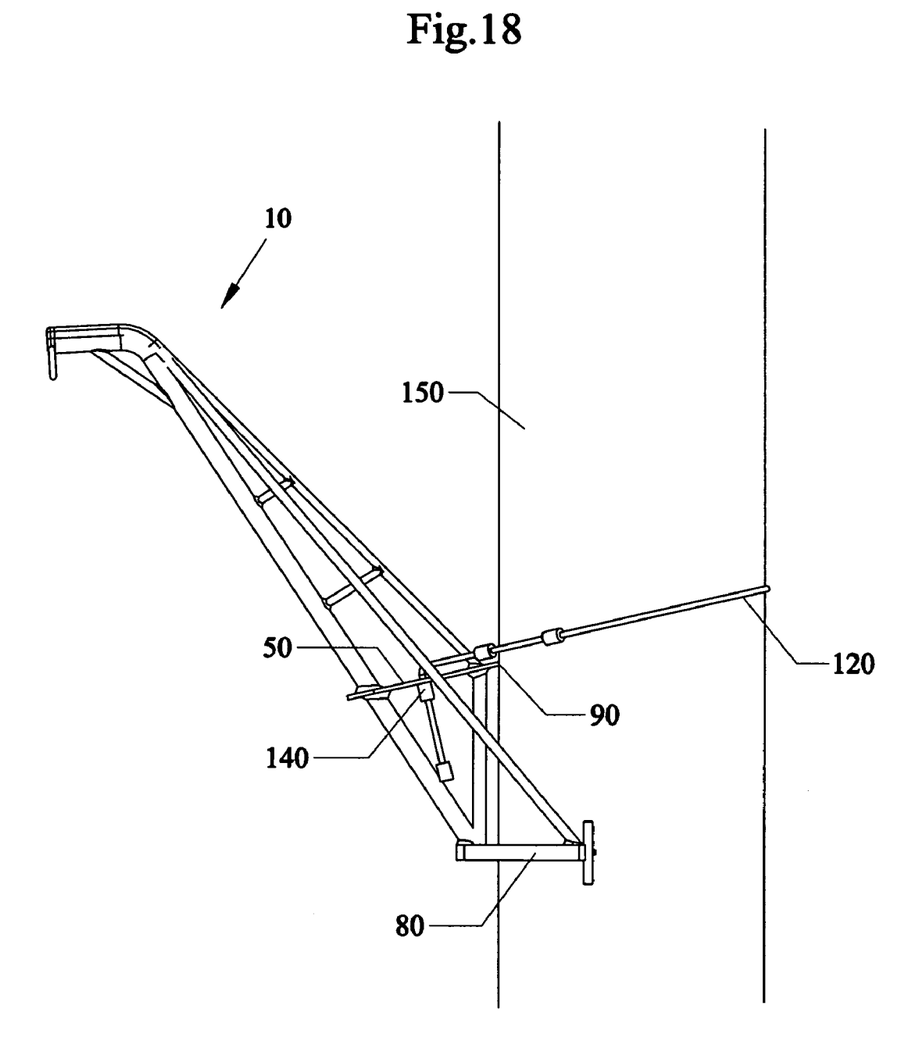
FIG. 18 is a side view of the hanger frame of the preceding figures installed on a tree by the cable with stopper ends.

FIG. 18 is a side view of the hanger frame 10 of the preceding figures installed on a tree 150 by the cable 120 with stopper ends 140A, 140B. The cable 120 can have a first series of different stoppers 140A on one end, and a second series of stoppers 140B on an opposite end of the cable 120. The plural series 140A, 140B of stoppers allows for the frame 10 to be fastened about different tree widths, and around other vertical supports such as pillars, posts, and even telephone type poles.

The invention has been tested by Roberts Calibration Inc. with a proof test applied of 2,000 pounds, and has a rated work load of up to approximately 1,000 pounds. Testing was done on Mar. 3, 2008 in a testing procedure which included the Game Tree Hanger being mounted so that the cable was pulled in straight tension to 100% in excess of rated capacity (Ton=2000 lbs.). Tension stress on a cable with wound stainless steel strands has been certified up to 1350 pounds. Metal cylindrical stoppers that were crimpled onto the wound cable strands were tested at both ends of the cable, and resulted in a double rated capacity of 2,700 pounds.

Although the invention is described for supporting weights such as game carcasses, the invention can be used to raise and support other weights in the air. For example, the motorcycles, bicycles, vehicles, jeeps, large plants, water barrels, punching bags, can be raised and lowered with the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A portable hanger for raising and supporting weights to a post, comprising:
    a frame having a crane shape with an enlarged base having an indented side adapted for wrapping about a perimeter portion of an upright post, and an upper end having narrow bent tip for supporting a weight therefrom, the frame having a plurality of elongated bars that are attached at a bottom end to the enlarged base and at a top end to the upper end of the frame;
    a mounting plate having a first keyhole slot and a second keyhole slot, that is fixably attached to a midportion of the frame between the enlarged base and the upper end of the frame; and
    an elongated cable having a first end with a first enlarged stop, and a second end having a second enlarged stop, wherein the first enlarged stop of the cable is attached to the frame by the first keyhole slot, so that second end of the cable is wrapped about the post so that the second enlarged stop is inserted into a wide opening of the second keyhole slot and slid into a narrow portion of the keyhole slot, so that the frame is hanging from the post while both the first and the second enlarged stops of the cable are be locked into the first and the second keyhole slots, and while the bent narrow tip of the frame is angled away from and substantially above the enlarged base of the frame.

2. The portable hanger of claim 1, wherein the post includes: a tree.

3. The portable hanger of claim 1, wherein the supported weight includes:
    a game carcass.

4. The portable hanger of claim 1, wherein the cable includes:
   a plurality of enlarged stops in series on one of the first end and the second end of the cable.

5. The portable hanger of claim 1, wherein the cable includes:
   a plurality of enlarged stops in series on both the first end and the second end of the cable.

6. The portable hanger of claim 1, wherein the indented side of the enlarged base includes: raised grooved edges for gripping about a surface portion of the post.

7. The portable hanger of claim 1, wherein the frame includes:
   three bar members being spread apart at the enlarged base and joined together adjacent the tip end of the frame.

8. The portable hanger of claim 7, wherein the frame further includes:
   at least two cross members for joining portions of the three bar members together between the enlarged base and the tip end of the frame.

9. The portable hanger of claim 1, further comprising:
   vertical bar members on each outer end on the indented side of the bottom base, for stabilizing the frame the vertical bar members abutting against the post.

10. A method of mounting a hanger for raising waits above the ground, comprising the steps of:
    providing a triangular frame having an enlarged base with an indented side, and a bent tip upper end;
    providing a mounting plate on a midportion of the frame having a first and second keyhole slot;
    providing a cable having a first end with a first enlarged stop, and a second end with a second enlarged stop;
    inserting and locking the first enlarged stop of the a cable into the first keyhole slot, and having loose the second end of the cable with the second enlarged stopp;
    raising the triangular frame with one hand so that the indented side of the enlarged base rests against a side portion of a post while raising the upper end above and angled away from the base;
    wrapping the loose second end of the cable about the post with another hand;
    orienting the second enlarged stopp on the second end of the cable into a wide opening of the second keyhole slot; and
    sliding the second enlarged stop into a narrow opening of the keyhole slot; and
    allowing the weight of the hanger to be supported on the post by having a rear portion of the cable abut against a rear of the post, while the indented side of the enlarged bottom of the frame abuts against a front portion of the post and the upper end angles away from the post.

11. The method of claim 10, wherein the post includes: a tree.

12. The method of claim 10, wherein the weight includes: a game carcass.

13. The method of claim 10, further comprising the step of:
    providing a loop on the bent tip end of the frame; and
    attaching a rope to the weight;
    passing an opposite end of the rope through the loop; and
    pulling the opposite end of the rope so that the rope slides through the loop and raises the weight upward above a ground surface.

14. The method of claim 10, wherein the cable includes:
    a plurality of stoppers on one of the first end and the second end of the cable.

15. The method of claim 10, wherein the cable includes:
    a plurality of stoppers on both the first end and the second end of the cable.

16. The method of claim 10, further comprising the step of:
    providing vertical bar members on each outer end on the indented side of the bottom base; and
    stability the frame against the post by the vertical bar members abutting against the post.

* * * * *